US008885889B2

(12) United States Patent
Park et al.

(10) Patent No.: US 8,885,889 B2
(45) Date of Patent: Nov. 11, 2014

(54) PARKING ASSIST APPARATUS AND PARKING ASSIST METHOD AND PARKING ASSIST SYSTEM USING THE SAME

(71) Applicant: Hyundai Mobis Co., Ltd., Seoul (KR)

(72) Inventors: Sang Jun Park, Yongin-si (KR); Sung Jin Seo, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 111 days.

(21) Appl. No.: 13/715,983

(22) Filed: Dec. 14, 2012

(65) Prior Publication Data

US 2014/0105464 A1 Apr. 17, 2014

(30) Foreign Application Priority Data

Oct. 12, 2012 (KR) ........................ 10-2012-0113729

(51) Int. Cl.
G06K 9/00 (2006.01)
G08G 1/16 (2006.01)

(52) U.S. Cl.
CPC ............ *G06K 9/00812* (2013.01); *G08G 1/168* (2013.01)
USPC ....................................................... 382/104

(58) Field of Classification Search
None
See application file for complete search history.

(56) References Cited

U.S. PATENT DOCUMENTS

| 2002/0169537 | A1* | 11/2002 | Regensburger et al. | ........ 701/96 |
| 2006/0222207 | A1 | 10/2006 | Balzer et al. | |
| 2008/0040004 | A1 | 2/2008 | Breed | |
| 2009/0060273 | A1* | 3/2009 | Stephan et al. | ............... 382/103 |
| 2010/0117812 | A1* | 5/2010 | Laubinger et al. | ............ 340/435 |
| 2010/0283633 | A1* | 11/2010 | Becker et al. | .............. 340/932.2 |
| 2011/0175752 | A1* | 7/2011 | Augst | ........................... 340/905 |

FOREIGN PATENT DOCUMENTS

| DE | 102009051526 A1 | 5/2010 |
| EP | 2081167 A2 | 7/2009 |
| JP | 2001-146853 A | 5/2001 |
| JP | 2002-228734 A | 8/2002 |
| JP | 2010-009607 A | 1/2010 |
| KR | 10-2011-0061885 A | 6/2011 |
| KR | 10-1104609 B1 | 1/2012 |

OTHER PUBLICATIONS

European Search Report dated Jul. 2, 2013 of corresponding European Patent Application No. 12195391.3—9 pages.

Aue, et al., Efficient Segmentation of 3D LIDAR Point Clouds Handling Partial Occlusion, 2011 IEEE Intelligent Vehicles Symposium (IV), Jun. 5-9 2011, pp. 423-428, Baden-Baden, Germany.

\* cited by examiner

*Primary Examiner* — Stephen R Koziol
*Assistant Examiner* — Delomia Gilliard
(74) *Attorney, Agent, or Firm* — Knobbe Martens Olson & Bear LLP

(57) ABSTRACT

Disclosed are a parking assist apparatus, a parking assist method capable of more accurately recognizing a parking space and identifying and recognizing obstacles using a three-dimensional flash Lidar and a parking assist system using the same. The parking assist apparatus according to an exemplary embodiment of the present invention includes: an information unit acquiring information collected by using a three-dimensional flash Lidar; and a determination unit determining at least any one of a parking space and presence and absence of obstacles using the information acquired by the information unit.

6 Claims, 3 Drawing Sheets

PARKING ASSIST APPARATUS AND PARKING ASSIST METHOD AND PARKING ASSIST SYSTEM USING THE SAME

CROSS-REFERENCE TO RELATED APPLICATIONS

This application claims priority to and the benefit of Korean Patent Application No. 10-2012-0113729 filed in the Korean Intellectual Property Office on Oct. 12, 2012, the entire contents of which are incorporated herein by reference.

TECHNICAL FIELD

The present disclosure relates to a parking assist apparatus, a parking assist method and a parking assist system using the same, and more particularly, to a parking assist apparatus and a parking assist method capable of more accurately recognizing a parking space.

BACKGROUND TECHNOLOGY

The existing parking assist system used for a vehicle generally uses a camera or an ultrasonic sensor. Korean Patent Application Laid-Open Publication No. 10-2011-0061885 is the published document associated with a parking assist system using an ultrasonic sensor.

However, there is a problem in that recognizing a parking space for a vehicle and obstacles using an ultrasonic sensor may have a low recognition rate due to a diffused reflection phenomenon in terms of characteristics of an ultrasonic sensor according to the environment.

In the case of using an ultrasonic sensor, there is a problem in that the ultrasonic sensor easily recognizes large objects but cannot easily recognize small objects such as a parking preventing cone and is insensitive to recognition of rapidly moving objects like moving pedestrians.

In the case of using a camera, there is a problem in that the camera may be sensitive to environment changes such as an image state, illumination, and the like.

Therefore, the existing parking assist system using the camera or the ultrasonic sensor has risks of various accidents such as a vehicle damage caused by small objects, an accident caused by not recognizing rapidly moving pedestrian, and the like.

SUMMARY

An aspect of the present invention has been made in an effort to provide a parking assist apparatus and a parking assist method capable of providing accurate parking space information and information on obstacles to a driver using a three-dimensional flash Lidar so as to assist safety driving and a parking assist system using the same.

An exemplary embodiment of the present invention provides a parking assist apparatus, including: information unit acquiring information collected by using a three-dimensional flash Lidar; and a determination unit determining at least any one of a parking space and presence and absence of obstacles using the information acquired by the information unit.

The parking assist apparatus may further include: a generation unit generating a three-dimensional volume image using the information acquired by the information unit, wherein the determination unit includes a determination unit determining at least any one of the parking space and the presence and absence of obstacles using the generated three-dimensional volume image.

The information unit may generate intensity information and depth information using the acquired information and the generation unit may generate the three-dimensional volume image using the intensity information and the depth information.

The determination unit may determine kinds of obstacles using the information acquired by the information unit if it is determined that the obstacles are present. Another exemplary embodiment of the present invention provides a parking assist system, including: a three-dimensional flash Lidar mounted in a vehicle; and a parking assist apparatus including an information unit acquiring information collected by the three-dimensional flash Lidar; a generation unit generating a three-dimensional volume image using the acquired information; and a determination unit determining at least any one of a parking space and presence and absence of obstacles using the generated three-dimensional volume image.

The acquired information may include intensity information and depth information and the generation unit may generate the three-dimensional volume image using the intensity information and the depth information.

The determination unit may determine the kinds of obstacles using the generated three-dimensional volume image if it is determined that the obstacles are present.

Yet another exemplary embodiment of the present invention provides a parking assist method, including: acquiring information collected by using a three-dimensional flash Lidar; and determining at least any one of a parking space and presence and absence of obstacles using the information acquired in the acquiring of the information.

The parking assist method may further include: generating a three-dimensional volume image using the information acquired in the acquiring of the information, wherein the determining may include determining at least any one of the parking space and the presence and absence of obstacles using the generated three-dimensional volume image.

The acquired information may include intensity information and depth information and in the generating, the three-dimensional volume image may be generated using the intensity information and the depth information.

In the determining, kinds of obstacles may be determined using the information acquired in the acquiring of the information if it is determined that the obstacles are present.

According to the exemplary embodiments of the present invention, it is possible to more accurately provide the information on the parking space to a driver, as compared with the information on the parking space determined using the existing ultrasonic sensor.

According to the exemplary embodiments of the present invention, it is possible to more accurately provide the information on the obstacles to the driver.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
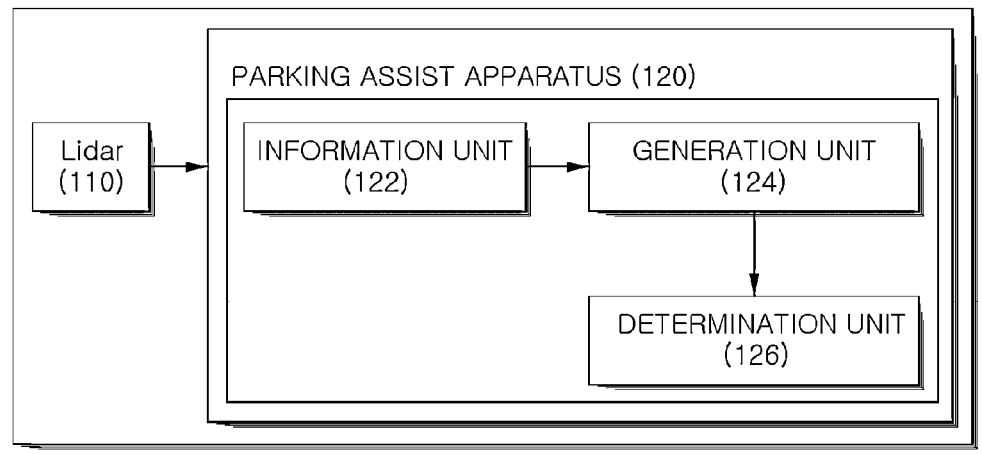
FIG. 1 is a block diagram of a parking assist system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described with reference to the accompanying drawings. Hereinafter, substantially same components are each denoted by like reference numerals in the following description and the accompanying drawings, and therefore a repeated description thereof will be omitted. In describing the present invention, when it is determined that the detailed description of the known art related to the present invention may obscure the gist of the present invention, the detailed description thereof will be omitted.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Unless explicitly described to the contrary, a singular form includes a plural form in the present specification. The term "comprise" and variations such as "comprises" or "comprising," used in the specification will be understood to imply the inclusion of stated constituent elements, steps, operations and/or elements but not the exclusion of any other constituent elements, steps, operations and/or elements.

FIG. 1 is a block diagram of a parking assist system according to an exemplary embodiment of the present invention.

Referring to FIG. 1, a parking assist system 100 according to an exemplary embodiment of the present invention includes a Lidar 110 and a parking assist apparatus 120.

The light detection and ranging (Lidar) 110 is mounted in a vehicle. The Lidar 110 may be mounted at all of the front, rear, left, and right of a vehicle and may be mounted only at the front, rear, left and right. Alternatively, the Lidar may also be mounted at both sides of a bumper of a vehicle.

The Lidar 110 is connected with the parking assist apparatus 120 in a wired or wireless type.

The Lidar of the parking assist system 100 according to the exemplary embodiment of the present invention may be a scan type Lidar 110, but may be a three-dimensional flash Lidar 110 so as to achieve the objects of the present invention.

The Lidar 110 may be a radar using laser beams as an electromagnetic wave, that is, a laser radar. The Lidar 110 has more excellent azimuth resolution, distance resolution, and the like, than the existing radar. The Lidar 110 uses laser beams and thus may measure small and low-speed objects as compared to an apparatus using a micro wave.

In detail, the Lidar 110 radiates laser and receives laser beams sequentially reflected and returned for a short period of time. The Lidar 110 may collect an intensity of the received reflected laser beam wavelength and information on the light receiving time.

The parking assist apparatus 120 may perform at least one of the determination of the parking space and the recognition of obstacles using the information collected by the Lidar 110.

In detail, the parking assist apparatus 120 may include an information unit 122, a generation unit 124, and a determination unit 126.

The information unit 122 may acquire the information collected by the Lidar 110 and generate intensity information and depth information using the collected information.

Alternatively, when the information unit 122 generates the intensity information and the depth information using the information collected by the Lidar, the information unit 122 may acquire the generated intensity information and depth information.

In detail, the information unit 122 may generate the intensity information and the depth information by using the intensity of the received reflected laser light wavelength that is the information collected by the Lidar 110 and the information on the light receiving time. In more detail, the information unit 122 may generate the intensity information by using the intensity of the laser light wavelength. The information unit 122 may generate the depth information by using the information on the light receiving time.

The generation unit 124 generates a three-dimensional volume image information by using the intensity information and the depth information generated or acquired by the information unit 122.

Figure 2:
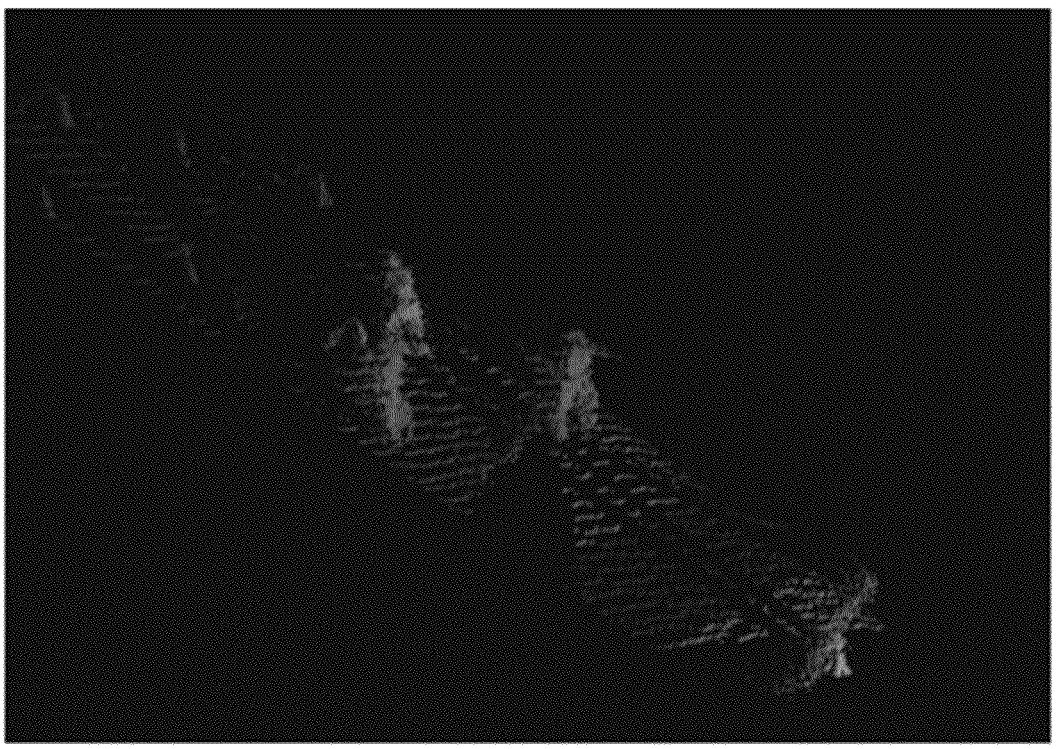
FIG. 2 is a diagram illustrating an example of a three-dimensional volume image generated by a generation unit of a parking assist apparatus according to an exemplary embodiment of the present invention.

FIG. 2 is a diagram illustrating an example of a three-dimensional volume image generated by a generation unit of a parking assist apparatus according to an exemplary embodiment of the present invention.

The three-dimensional volume image generated by the generation unit 124 includes the intensity information and the depth information.

The determination unit 126 performs at least any one of the parking space determination and the obstacle determination by using the information collected by the Lidar.

In detail, the determination unit 126 may analyze the three-dimensional volume image information generated by the generation unit 124 to determine the parking space and the obstacles.

The determination unit 126 analyzes the three-dimensional volume image information to calculate a width of the parking space and compares the calculated width of the parking space with a prestored width value of a vehicle to be parked to determine whether the parking may be made.

The prestored width value of a vehicle to be parked may be different according to types of vehicles, and for convenience of parking, a value obtained by adding a predetermined width to a width of a vehicle may also be stored.

The determination unit 126 determines that there is a space in which parking is available when the calculated width of a parking space is above a prestored width value of a vehicle or the width of the parking space calculated in consideration of the convenience of parking is above a value obtained by adding a predetermined value to the prestored width value of a vehicle.

When the determination unit 126 analyzes the three-dimensional volume image information to determine the parking space, it may be determined whether obstacles are present in the generated three-dimensional volume image to calculate the width of the space in which obstacles are not present and compare the calculated width with the prestored width value of a vehicle, thereby determining the parking space.

Describing in detail the case in which the determination unit 126 determines the presence or absence of obstacles and kinds of obstacles, the determination unit 126 may analyze the three-dimensional volume image to determine whether obstacles are present in the parking space or on the parking trace. The determination unit 126 may also determine the kinds of present obstacles if it is determined that obstacles are present.

Here, the obstacles generally mean factors of hindering a parking of a vehicle such as other vehicles, pedestrians, a manhole, a speed bump, and the like and may also include objects thrown into a parking space, fragments occurring due to a traffic accident, and the like.

In detail, the determination unit 126 determines the existence of obstacles using the intensity information included in the three-dimensional volume image. The intensity values are different for each object, and therefore the determination unit 126 may compare the intensity values included in the three-dimensional volume image to determine the presence or absence of obstacles and the kinds of obstacles. In order to compare the intensity values, the determination unit 126 may store the intensity values of various kinds of obstacles such as other vehicles, pedestrians, a speed bump, thrown objects, and the like. That is, the determination unit 126 may determine obstacles corresponding to the stored intensity values matching the intensity values included in the three-dimensional volume image as the kinds of corresponding obstacles.

The determination unit 126 determines whether obstacles are present in the parking space, thereby determining that obstacles are present in the determined parking space, when the range of the intensity value different from the range of the intensity values of objects forming a parking space is present.

That is, when objects forming the parking space are concrete or a road, the intensity value of concrete or road may occupy most of the parking space. The determination unit 126 may determine that obstacles are present in the parking space when the intensity value different from the intensity value of concrete or road in the parking space is present in the predetermined area. As described above, the kinds of obstacles determined as being present may be determined by matching the intensity value of obstacles with various kinds of pre-stored intensity values. The method of allowing the determination unit 126 to determine the presence or absence of obstacles and the kinds of obstacles that are present on the parking trace is the same as the method of determining the presence or absence of obstacles and the kinds of obstacles that are present in the parking space.

However, the information on the parking trace can be acquired by an apparatus or a system for calculating the parking trace of a vehicle and the parking assist system 100 according to the exemplary embodiment of the present invention may be combined with an apparatus or a system for calculating a parking trace of a vehicle.

The determination unit 126 may set an area of interest in the three-dimensional volume image and determine the presence and absence of obstacles and the kinds of obstacles only in the set area of interest.

The area of interest set by the determination unit 126 may be the determined parking space and the calculated parking trace of a vehicle.

The determination unit 126 may also acquire information on a location at which obstacles are present and a distance between obstacles and a vehicle by using the depth information included in the three-dimensional volume image.

The parking assist apparatus 120 and the parking assist system 110 according to the exemplary embodiment of the present invention can more accurately determine the parking space and obstacles.

The parking assist apparatus 120 and the parking assist system 110 according to the exemplary embodiment of the present invention are combined with an apparatus or a system associated with parking such as an automatic parking system of a vehicle, a parking trace calculating apparatus, and the like, thereby implementing more accurate and safe parking.

Figure 3:
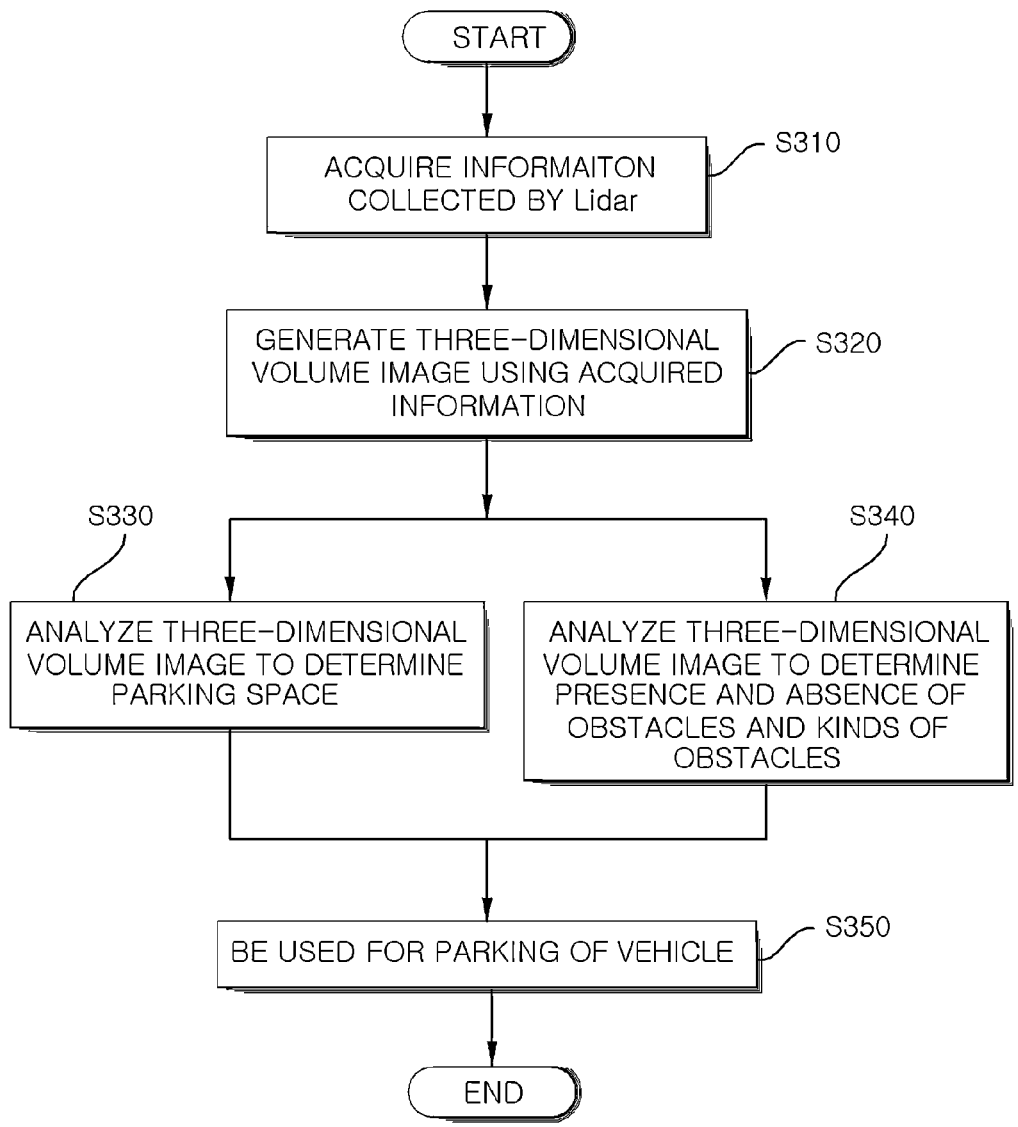
FIG. 3 is a flow chart of a parking assist method according to an exemplary embodiment of the present invention.

FIG. 3 is a flow chart of a parking assist method according to an exemplary embodiment of the present invention.

Describing a parking assist method according to the exemplary embodiment of the present invention with reference to FIG. 3, the information unit 122 acquires the information collected by the Lidar (S310). When the information generated from the Lidar is present, the generated information may be acquired by the information unit 122.

The generation unit 124 uses the information acquired by the information unit 122 to generate a three-dimensional volume image (S320).

The determination unit 126 analyzes the three-dimensional volume image to determine a parking space (S330). Alternatively, the determination unit 126 may analyze the three-dimensional volume image to determine the parking space, the circumference of the parking space that can hinder the parking of a vehicle, the presence and absence of obstacles and the kinds of obstacles that are present on the parking trace, and the like (S340).

The information on the parking space, the presence and absence of obstacles, or the kinds of obstacles that are determined by the determination unit 126 is provided to a driver through voice, a screen, and the like, thereby assisting a parking of a driver (S350).

Alternatively, the information on the parking space, the presence and absence of obstacles, or the kinds of obstacles that are determined by the determination unit 126 is provided to the parking trace calculating apparatus, the automatic parking apparatus, the parking assist system, and the like, that are mounted in a vehicle, thereby assisting more accurate parking.

A block diagram of the parking assist apparatus 120 according to the exemplary embodiment of the present invention is to be understood as showing the illustrative conceptual aspects embodying the principle of the present invention. Similarly, it is to be noted that all the flow charts may be substantially represented in a computer readable medium and represent various processes executed by a computer or a processor irrespective of whether the computer or the processor is clearly shown in the drawings.

A function of a processor or various elements shown in the drawings including functional blocks represented as a concept similar thereto may be provided by using dedicated hardware and hardware with ability executing software in connection with appropriate software. When the functions are provided by the processor, the functions may be provided by a single dedicated processor, a single sharing processor, or a plurality of individual processor and some thereof can be shared.

Terms presented as processor, control, or a concept similar thereto are not construed as exclusively including hardware having ability executing software and are to be construed as implicitly including digital signal processor (DSP) hardware and ROM, RAM, and non-volatile memory for storing software. Widely known other hardware may also be included.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for assisting vehicle parking, the system comprising:
   a three-dimensional flash Lidar mounted on a vehicle, the Lidar being configured to transmit laser beams to surroundings of the vehicle and detect reflections of at least part of the transmitted laser beams reflected on surfaces of the surroundings, the Lidar providing information indicative of intensity of reflections detected by the Lidar; and
   a three-dimensional model generation module configured to generate a three-dimensional model of surroundings of the vehicle, wherein the three-dimensional model generation module is configured to determine presence of an object at a location by comparing intensity of reflections from the location against intensity that laser beams would have when reflected on a concrete or street surface; and
   a determination module configured to determine availability of a parking space in the surroundings of the vehicle based on determination of presence of the object at the location.

2. The system of claim 1, wherein the Lidar is further configured to provide information indicative of depth of reflections detected by the Lidar, and
   wherein the three-dimensional model generation module is configured to use the intensity and the depth of the reflections detected by the Lidar for generating the three-dimensional model.

3. The system of claim 1, wherein the determination module is further configured to identify the type of the object using the three-dimensional model.

4. A method of assisting parking of a vehicle, the method comprising:
   providing the system of claim 1;
   transmitting, by the Lidar, laser beams to surroundings of the vehicle;
   detecting, by the Lidar, reflections of at least part of the transmitted laser beams reflected on surfaces of the surroundings, the Lidar providing information indicative of intensity of reflections detected by the Lidar;
   generating a three-dimensional model of surroundings of the vehicle on the three-dimensional model generation module, wherein generating comprises determining presence of an object at a location by comparing intensity of reflections from the location against intensity that laser beams would have when reflected on a concrete or street surface; and
   determining availability of a parking space in the surroundings of the vehicle based on determination of presence of the object at the location.

5. The method of claim 4, wherein the Lidar further provides information indicative of depth of reflections detected by the Lidar, and
   wherein generating the three-dimensional model uses the intensity and depth of the reflections detected by the Lidar.

6. The method of claim 4, further comprising identifying the type of the object using the three-dimensional model.

* * * * *